United States Patent [19]
Kellogg, Jr. et al.

[11] Patent Number: 6,098,494
[45] Date of Patent: Aug. 8, 2000

[54] MOUNTING DEVICE AND METHOD FOR INSTALLING STEERING WHEEL

[75] Inventors: Darrell A. Kellogg, Jr., Belleville; Norinari Nagata, West Bloomfield; Joseph Mannino, Bloomfield Hills; Peter L. Vigeant, Canton, all of Mich.

[73] Assignee: Toyoda Gosei Co., Ltd., Aichi-ken, Japan

[21] Appl. No.: 09/107,506

[22] Filed: Jun. 30, 1998

[51] Int. Cl.[7] ....................................................... B62D 1/10
[52] U.S. Cl. .................................................. 74/552; 403/8
[58] Field of Search ............................ 74/552, 492, 493; 280/779; 403/334, 333, 373, 8

[56] References Cited

U.S. PATENT DOCUMENTS

| | | | |
|---|---|---|---|
| 5,692,770 | 12/1997 | Scharboneau et al. | 74/552 X |
| 5,749,598 | 5/1998 | Exner et al. | 74/552 X |
| 5,832,787 | 11/1998 | Heilig | 74/552 |
| 5,878,629 | 3/1999 | Nagata et al. | 74/552 |

FOREIGN PATENT DOCUMENTS

| | | |
|---|---|---|
| 2-133955 | 11/1990 | Japan . |
| 09066843 | 3/1997 | Japan . |

*Primary Examiner*—Mary Ann Battista
*Attorney, Agent, or Firm*—Pillsbury Madison & Sutro LLP

[57] ABSTRACT

A device for mounting an integrally formed steering wheel on the steering shaft of a vehicle. The device includes a boss to couple the steering wheel to the steering shaft on which is rotatably mounted a fastener that is rotated by a drive gear arrangement. The drive gear is on shaft that is rotatably mounted in a housing connected to the boss so that the drive gear that meshes with a complementary drive gear on the fastener to rotate and fasten the steering wheel to the steering shaft. Retainers are used to support the gear shaft to opposing sidewalls of the housing, and include bushings located between the retainer and the gear shaft.

14 Claims, 6 Drawing Sheets

MOUNTING DEVICE AND METHOD FOR INSTALLING STEERING WHEEL

BACKGROUND OF THE INVENTION

The present invention relates to steering wheels for vehicles, and more particularly, to a mounting structure for a steering wheel having a ring cover, a spoke cover and a pad that are formed integrally.

A typical steering wheel includes an annular gripping ring and a pad. The pad is located at the center of the ring and connected to the ring by spokes. The spokes are integrally formed with a boss plate, which is coupled to a steering shaft. Japanese Unexamined Utility Model Publication No. 2-133955 describes a steering wheel having a ring cover, a spoke cover and a pad that are formed integrally. The boss plate of this steering wheel includes a male threaded fastener, and a corresponding threaded hole is formed axially in a steering shaft. The steering wheel is secured to the steering shaft by tightly threading the threaded fastener into the hole.

The ring cover, the spoke cover and the pad, which are formed integrally, limit the space in front of the boss plate. Therefore fastening the threads is troublesome. Japanese Unexamined Patent Publication No. 9-066843 describes a mounting structure for steering wheels to overcome this drawback. In this structure, splines are formed in a boss plate and corresponding splines are formed on a steering shaft. When installing the steering wheel on a steering shaft, the splines are initially engaged to mesh with each other. This fixes the rotational position of the steering wheel relative to the steering shaft. Thereafter, a threaded nut, which is connected to the boss plate, is fastened to a threaded distal end the steering shaft.

However, if the threaded distal end of the steering shaft is threaded into the nut when the splines are not yet securely meshed with each other, the steering wheel will not be firmly fixed to the steering shaft and chattering may occur. Therefore, the splines need to be fully meshed with each other before tightening the threads. This complicates the assembly of the steering wheel and lengthens the assembly process.

SUMMARY OF THE INVENTION

Accordingly, it is an objective of the present invention to provide an improved mounting structure for steering wheels having an integrally formed spoke cover and a pad. Specifically, an objective of the present invention is to provide a mounting structure for steering wheels that facilitates the installation of the steering wheel to a steering shaft.

To achieve the foregoing and other objectives and in accordance with the purpose of the present invention, a device for mounting a steering wheel on a steering shaft of a vehicle is provided. The device includes a boss, outer splines, a first set of threads, a fastener, a driven gear, a gear shaft and a retainer. The boss is located at the center of the steering wheel. The boss includes a hole for receiving the steering shaft. Inner splines are formed on the inner wall of the hole. The outer splines are formed on the circumference of the steering shaft and are engaged with the inner splines when the distal end of the steering shaft is received by the boss. The first set of threads is provided at the distal end of the steering shaft. The fastener is rotatably connected to the steering wheel. The fastener includes a second set of threads. The boss is secured to the steering shaft by fastening the fastener to the steering shaft by tightening the first set of threads to the second set of threads. The driven gear is formed on the surface of the fastener. The gear shaft is supported by the steering wheel and includes a drive gear that meshes with the driven gear. Rotation of the gear shaft causes the fastener and the second set of threads to rotate for fastening the fastener to the steering shaft. The retainer is connected to the steering wheel for retaining the fastener. The fastener is loosely connected to the retainer to permit the fastener to rotate and to move axially within predetermined limits. The retainer is constructed and arranged to hold the fastener in a position that is axially spaced from the boss prior to installation of the steering wheel so that the inner and outer splines will engage before the first and second threads engage during installation.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
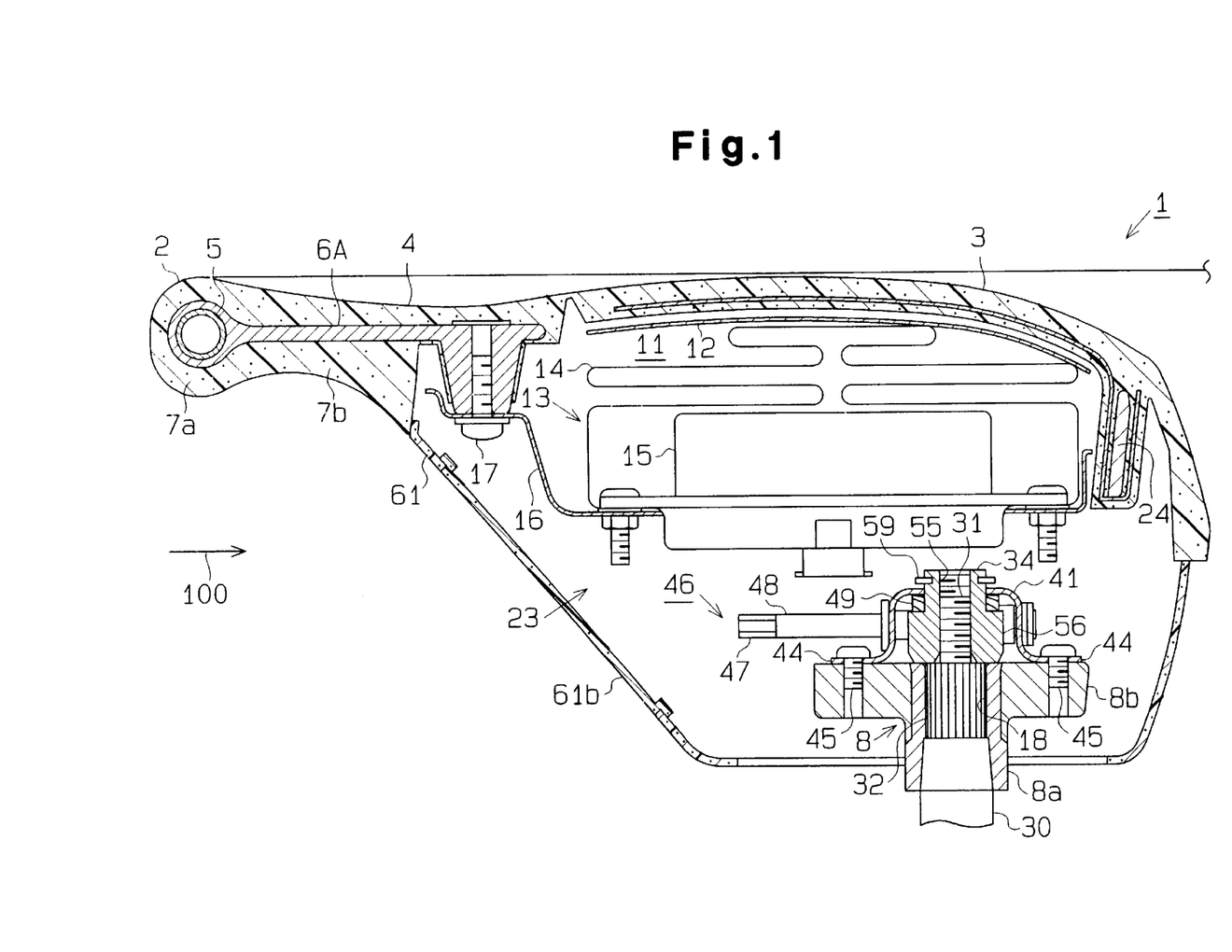
FIG. 1 is a partial cross-sectional view illustrating a steering wheel according to a first embodiment of the present invention.
Figure 4:
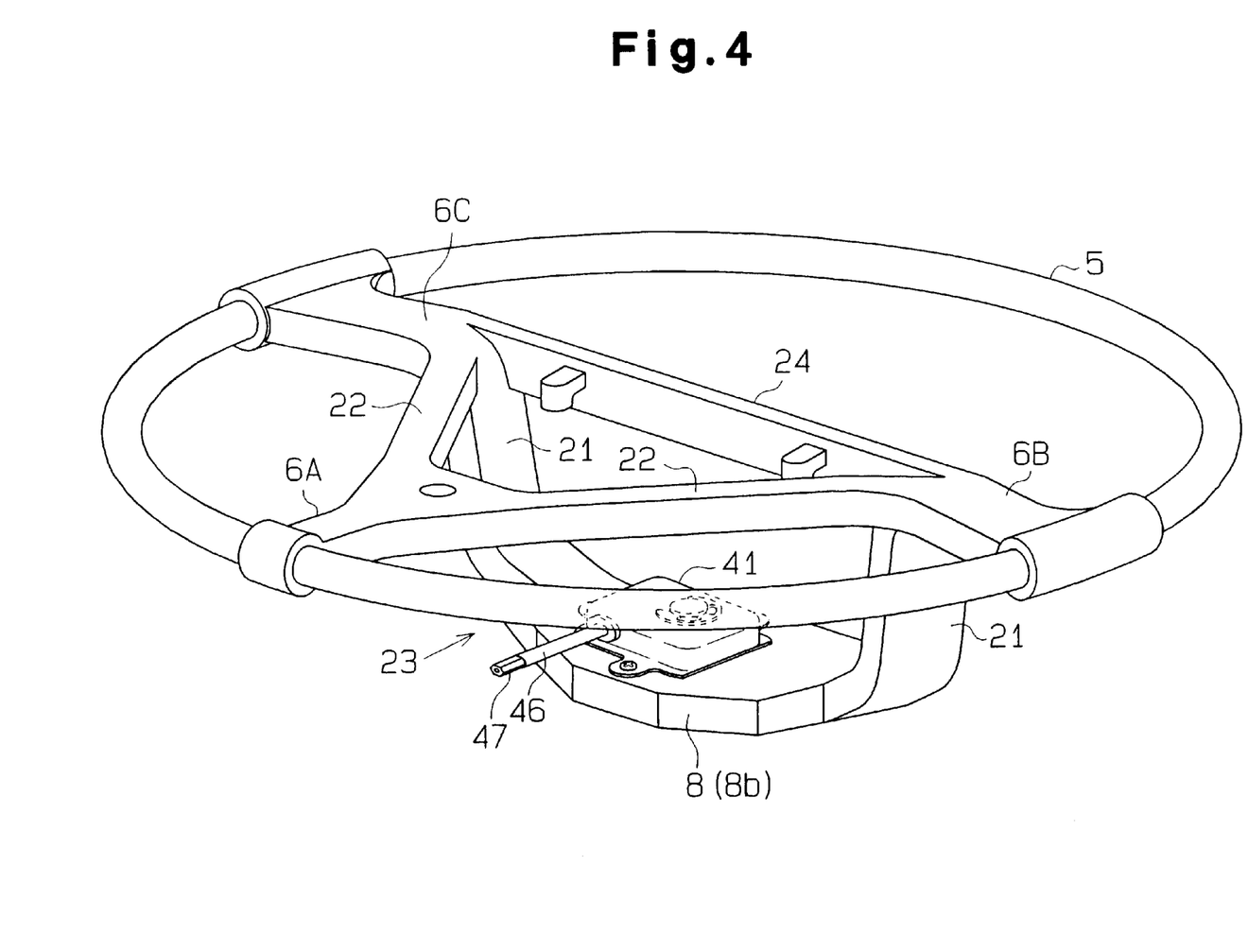
FIG. 4 is a perspective view illustrating a frame of the steering wheel of FIG. 1.

As shown in FIGS. 1 and 4, a body 1 of a steering wheel includes an annular gripping ring 2, a pad 3 arranged at the center of the ring 2 and three spokes 4 radially extending from the pad 3 for connecting the pad 3 with the ring 2. The ring 2 includes a ring core 5 made of a steel pipe and a ring cover 7a covering the ring core 5. The spokes 4 include metal spoke cores 6A, 6B, 6C, which are diecast from a light metal such as magnesium alloy. The spoke cores 6B and 6C are coupled to each other by a support bar 24. A spoke cover 7b covers the spoke cores 6A–6C. The covers 7a, 7b and the pad 3 are integrally formed from a soft synthetic resin such as polyurethane foam.

A boss 8 is located behind the steering wheel body 1 from the perspective of the driver. The boss 8 couples the steering wheel to a steering shaft 30. The boss 8 includes a cylindrical portion 8a and a plate 8b that are fixed to each other. The cylindrical portion 8a is made of steel and is located at the center of the plate 8b. The plate 8b is diecast from a light metal such as magnesium.

An accommodating space 11 is defined below the pad 3. A membrane switch 12 and an air bag device 13 are located in the space 11. The membrane switch 12 has a pair of thin plates. When the pad 3 is pressed, the thin plates contact each other and activate a horn.

The air bag device 13 includes a bag holder 16, which accommodates a bag 14 and an inflator 15. The bag 14 is retained in a folded state and the inflator 15 supplies inflation gas to the bag 14. The bag holder 16 is fixed to the spoke core 6A and to the support bar 24 by screws 17.

Figure 6:
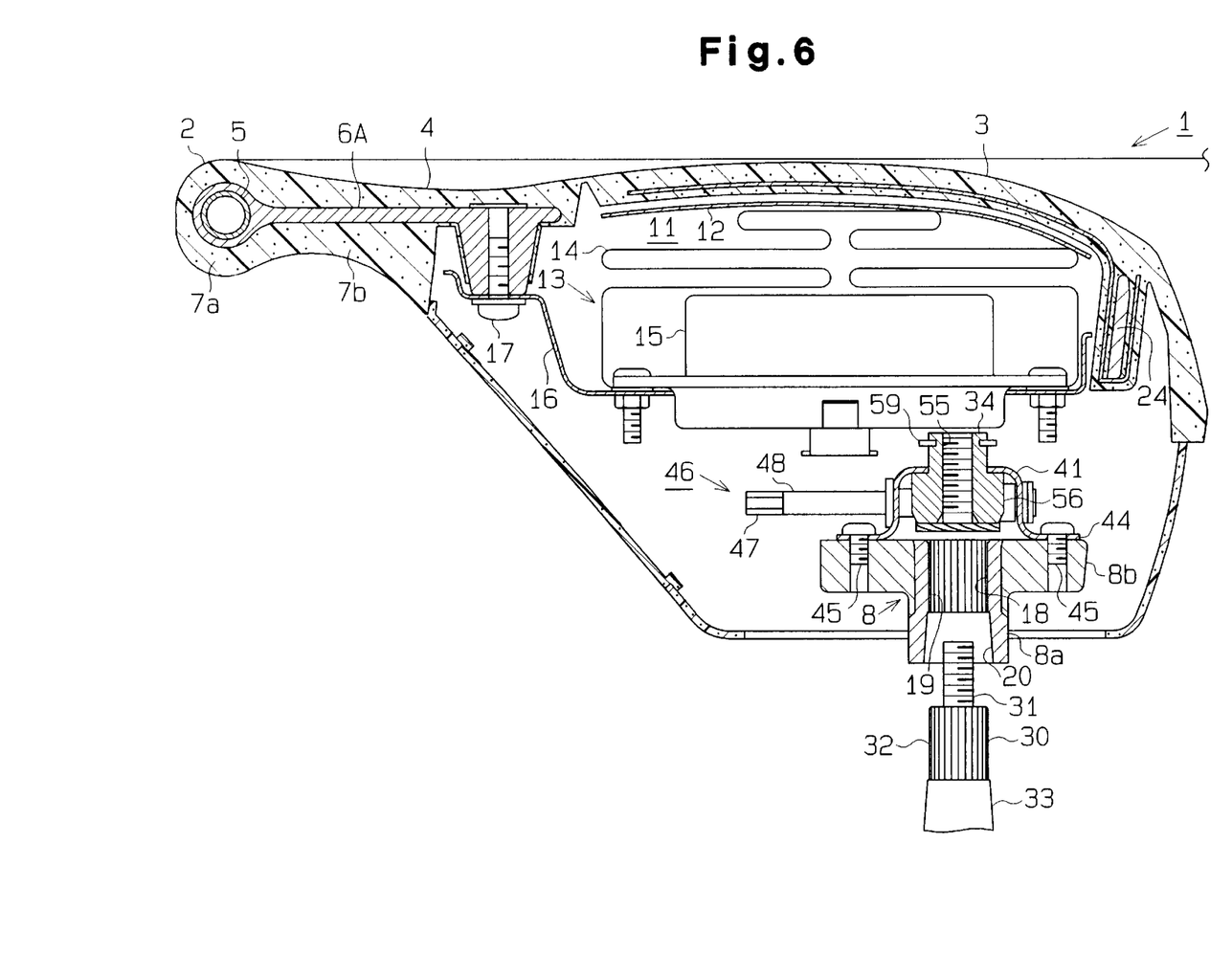
FIG. 6 is a partial cross-sectional view showing the steering wheel of FIG. 1 and a steering shaft.

The mounting structure of the steering wheel will now be described with reference to FIGS. 4 and 6. As shown in FIG. 6, a bolt 31 extends from the distal end of the steering shaft 30. A set of outer splines 32 is formed on the circumference of the shaft 30 below the bolt 31. The number of splines is generally thirty. A tapered surface 33 is formed proximally of the splines 32.

The boss 8 placed on the end of the steering shaft 30 and is fixed to the shaft 30 by a fastener, or nut 34, which is threaded to the bolt 31. A through hole 18 extends in the center of the cylindrical portion 8a of the boss 8. A tapered surface 20 is formed at the back end portion of the hole 18, and a set of inner splines 19 is formed in the front end portion of the hole 18. When the boss 8 is mated with the shaft 30, the tapered portion 20 contacts the tapered portion 33 of the shaft 30 and the inner splines 19 mesh with the outer splines 32 on the shaft 30.

As shown in FIG. 4, the boss 8 is coupled to the spoke cores 6B, 6C by connecting portions 21. The boss 8 is located behind the spoke cores 6B, 6C.

Frame members 22 connect two of the spoke cores 6B, 6C to the other spoke core 6A. This structure rigidly connects the spoke cores 6A, 6B, 6C, the ring core 5, and the boss 8 to one another. The connecting structure of the boss 8, the connecting portions 21 and the frames 22 provides a relatively large lateral opening 23. The support bar 24, which connects the spoke cores 6B, 6C, ensures stability during inflation of the bag 14.

Figure 2:
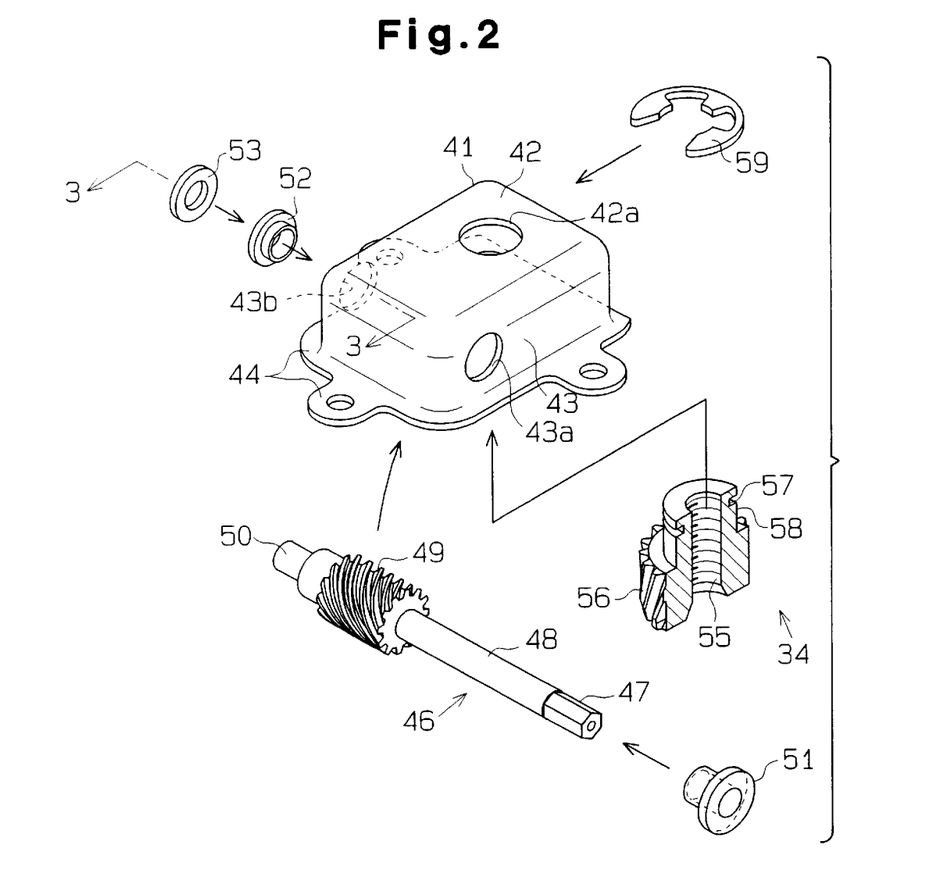
FIG. 2 is an exploded perspective view showing a gear nut and a worm shaft.

As shown in FIG. 1, a metal housing 41, or retainer, is fixed to the boss 8 and covers the front end of the through hole 18. As shown in FIG. 2, the housing 41 has a top wall 42, side walls 43 and a flange 44. The flange 44 is fixed to the boss 8 by screws 45. First and second aligned bushing holes 43a, 43b extend through opposite side walls 43. A gear shaft 46 extends through both holes 43a, 43b in a direction perpendicular to axis of the steering shaft 30. The gear shaft 46 includes a hexagonal portion 47, a straight section 48, a drive gear 49 and a small diameter portion 50. The drive gear 49 has helical teeth. The straight section 48 is supported in the first hole 43a by a bushing 51, which is made of a synthetic resin or rubber. The hexagonal portion 47 is therefore located outside of the housing 41.

Figure 3:
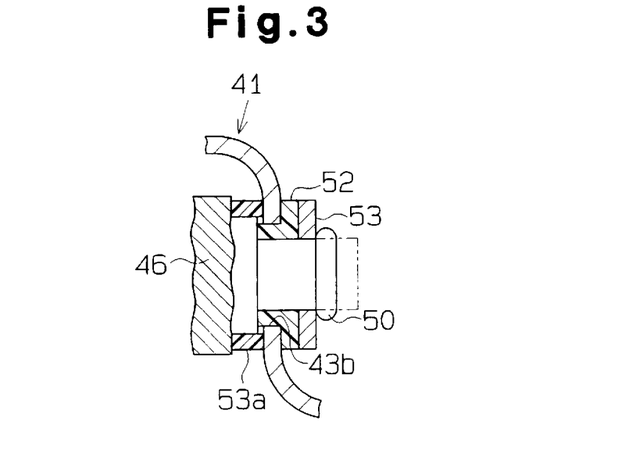
FIG. 3 is a cross-sectional view taken along line 3—3 of FIG. 2.

As shown in FIG. 3, the small diameter portion 50 is supported in the second hole 43b by a bushing 52, which is made of a synthetic resin or rubber. The small diameter portion 50 protrudes outward from the second hole 43b. A washer 53 is fitted to the distal end of the small diameter portion 50. An internal spacer 53a, which is made of a synthetic resin or rubber, is located around the small diameter portion 50 between the housing 41 and the gear shaft 46. The small diameter portion is flattened to prevent the smaller diameter portion 50 from entering the housing 41. In this manner, the gear shaft 46 is supported by the bushings 51, 52 and the internal spacer 53a and extends perpendicularly to the axis of the steering shaft 30. The internal spacer 53a prevents the gear shaft 46 from interfering with the housing 41 by positioning the gear shaft 46 at a predetermined position. Thus, noise is suppressed. The bushings 51, 52 and the internal spacer 53a fix the axial position of the gear shaft 46 while allowing the gear shaft 46 to rotate. Rotating the gear shaft 46 produces friction between the gear shaft 46 and the bushings 51, 52 and between the bushings 51, 52 and the associated holes 43a, 43b. Therefore, a force that overcomes the frictional resistance is required to rotate the gear shaft 46.

The housing 41 accommodates the nut 34. The nut 34 is substantially cylindrical and extends perpendicularly to the gear shaft 46. The nut 34 also has an axial threaded hole 55 for receiving the bolt 31 of the steering shaft 30. A driven gear 56, which has helical teeth, is formed in the circumference of the nut 34. The nut 34 also includes a small diameter portion 58 formed adjacent to the gear 56. The gear 56 and the small diameter portion 58 define a step. An annular groove 57 is formed in the circumference of the small diameter portion 58. The nut 34 is fitted in a hole 42a, which is formed in the front wall 42 of the housing 41, with the small diameter portion 58 protruding from the hole 42a. The groove 57 is thus located outside the hole 42a. A snap ring 59 is snapped about the groove 57. The snap ring 59 prevents the nut 34 from falling off from the housing 41. Within limits, the nut 34 is movable along its axis. Specifically, the nut 34 moves between a first position, where it separates from the boss 8 and the step contacts the front wall 42, and a second position where the step separates from the front wall 42 and the nut 34 contacts the boss 8.

The driven gear 56 meshes with the drive gear 49 of the gear shaft 46. Therefore, the nut 34 is rotated by rotating the gear shaft 46.

Figure 5:
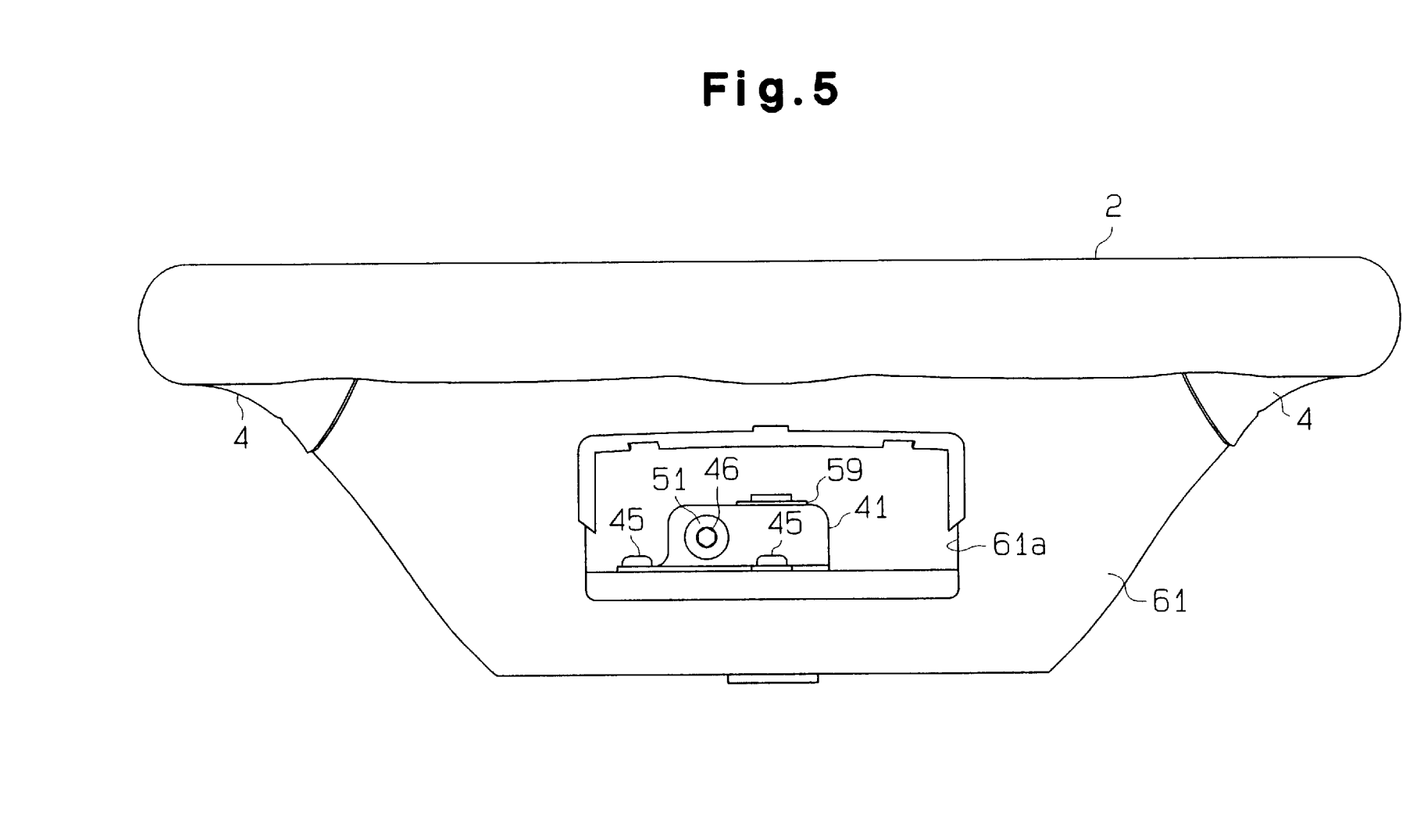
FIG. 5 is a view showing the steering wheel from the direction indicated by arrow 100 in FIG. 1.

A resin cover 61 covers the rear side of the spoke cores 6A–6C, as shown in FIGS. 1 and 5. The cover 61 has an opening 61a and a lid 61b for closing the opening 61a. The opening 61a is opened for rotating the gear shaft 46 and is closed with the lid 61b after the installation of the steering wheel is completed.

To mount the steering wheel on the steering shaft 30, the boss 8 is attached to the distal end of the steering shaft 30 as illustrated in FIG. 6. At this time, the nut 34 is moved to the first position (against the front wall 42) as a result of having previously rotated the hexagonal portion 47 of the gear shaft 46. The boss 8 is positioned so that the splines 32 of the steering shaft 30 are engaged with the splines 19 of the boss 8. The engagement of the splines 32, 19 prevents the bolt 31 from interfering with the lower face of the nut 34 and aligns the bolt 31 with the threaded hole 55.

Figure 7:
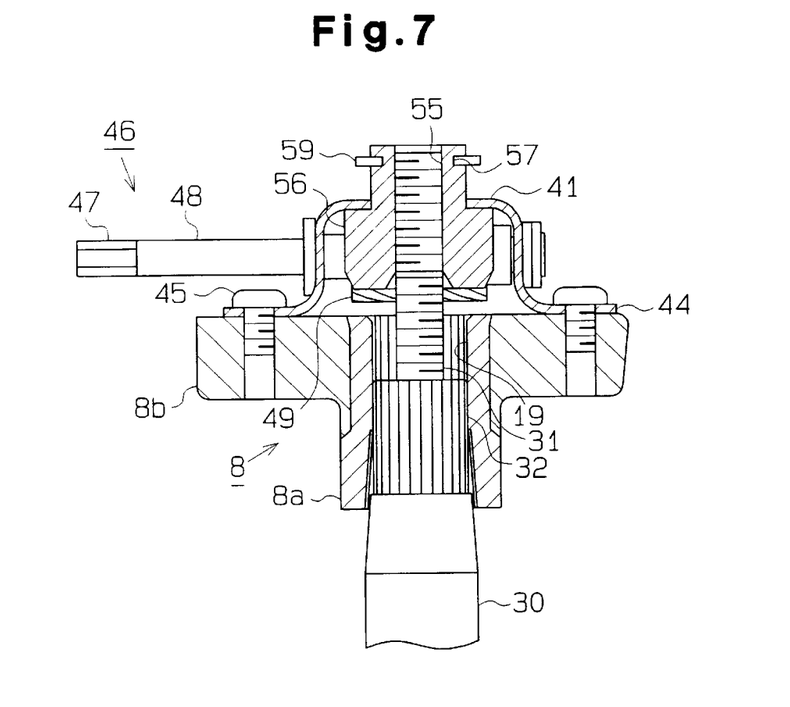
FIG. 7 is an enlarged partial cross-sectional view illustrating the steering wheel FIG. 1 being installed on the steering shaft of FIG. 6.

In this state, the nut 34 is threaded to the bolt 31. at is, a fastening tool (not shown) is inserted through the opening 61a of the cover 61 and fitted to the hexagonal portion 47 of the gear shaft 46. The gear shaft 46 is then rotated in a predetermined direction by the fastening tool.

Figure 8:
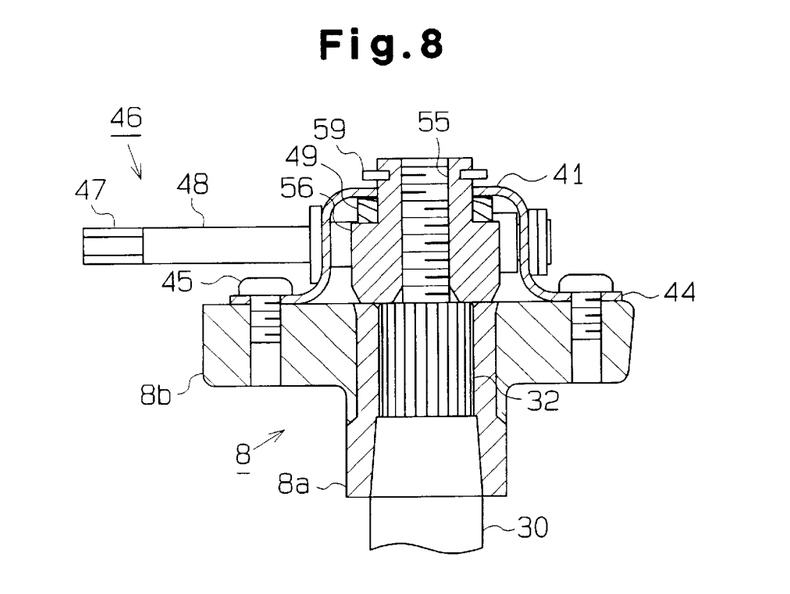
FIG. 8 is an enlarged partial cross-sectional view illustrating the steering wheel FIG. 1 assembled with the steering shaft of FIG. 6.

The torque of the gear shaft 46 is transmitted to the driven gear 56 of the nut 34 by the drive gear 49 and rotates he nut 34 in a predetermined fastening direction. Accordingly, the threaded hole 55 of the nut 34 is fastened to the bolt 31 of the steering shaft 30. As a result, the shaft 30 is fully seated in the boss 8 in the axial direction and the splines 32, 19 are fully meshed. The boss 8 is therefore firmly fastened to the steering shaft 30 as shown in FIG. 8. The installation of the steering wheel on the steering shaft 30 is completed by closing the opening 61a with the lid 61b.

The illustrated embodiment has the following advantages.

In the illustrated structure, the nut 34 is not rotated from the axial front of the boss 8 (the driver's side of the boss 8) but is rotated by the gear shaft 46 extending perpendicular to the steering shaft 30. Therefore, the steering wheel is easily and securely mounted on the steering shaft 30 despite the integrally formed pad 3 and covers 7a, 7b. This improves efficiency when installing the steering wheel.

The nut 34 is movable in the axial direction relative to the housing 41. Therefore, the nut 34 is axially spaced from the boss 8 when the installer is orienting the body 1 of the steering wheel relative to the steering shaft 30. In other words, the rotational position of the steering shaft is determined by mating the splines 19, 32 with each other before the nut 34 is threaded to the bolt 31 of the shaft 30.

The drive gear 49 and the driven gear 56 have helical teeth. The drive gear 49 therefore remains meshed with the driven gear 56 even when the gears 49, 56 are slightly misaligned or even when the teeth of the gears 49, 56 are slightly deformed. Accordingly, rotation of the gear shaft 46 is positively transmitted to the gear bolt 34.

The drive gear 49 and the driven gear 56 correspond to a worm and a worm wheel in a worm gear transmission. Compared to a spur gear transmission, the gears 49, 56 take up a smaller space and require smaller force to fasten the nut 34.

The housing 41 is secured to the boss 8 and accommodates the nut 34 and the gear shaft 46. The housing 41 therefore prevents the nut 34 and the gear shaft 46 from falling off. Thus, the teeth of the driven gear 56 and the drive gear 49 remain firmly engaged with each other.

The bushings 51, 52 located between the gear shaft 46 and the holes 43a, 43b of the housing 41 prevent the gear shaft 46 from chattering. The bushings 51, 52 also produce friction when the gear shaft 46 is rotated. The gear shaft 46 therefore needs to be turned by a force that overcomes the friction before rotating.

The opening 61a formed in the cover 61 allows the gear shaft 46 to be rotated without interference by the cover 61.

The spoke core 6A and the boss 8 are not directly connected to each other, whereas the spoke cores 6B, 6C are integrally connected to the boss 8 by the connecting portions 21. This structure provides the opening 23. Thus, the air bag 13 and the membrane switch 12 are easily installed in the accommodating space 11.

Although the spoke core 6A is not directly coupled to the boss 8, the spoke core 6A is connected to the spoke cores 6B, 6C by the frame members 22. This ensures rigidity of the spoke cores 6A, 6B, 6C, the ring core 5, and the boss 8 in the same manner as in the case that the spoke cores 6A is directly coupled to the boss 8.

Although only one embodiment of the present invention has been described herein, it should be apparent to those skilled in the art that the present invention may be embodied in many other specific forms without departing from the sprit or scope of the invention.

(1) The worm gear mechanism may be replaced with other gear mechanisms that permit axial movement of the fastener 34.

(2) The air bag 13 shown in FIG. 1 may be replaced with a box-like shock-absorbing member.

(3) The membrane switch 12 shown in FIG. 1 may be replaced with a plate spring type horn switch mechanism.

(4) The boss 8 includes the cylindrical portion 8a and the plate 8b that are coupled to each other. However, the boss 8a and the plate portion 8b may be integrally formed from the same material.

(5) Light metal other than magnesium (for example, aluminum) may be used as the material of the spoke cores 6A, 6B, 6C. The spoke cores 6A, 6B, 6C may also be formed with steel. The steel includes hot rolled soft steel, as specified in Japanese Industrial Standard (JIS) G3131, cold rolled steel, as specified in JIS G3141, and electrolytic zinc-coated carbon steel, as specified in JIS G3313.

(6) The distal end of the gear shaft 46 is not required to a hexagonal cross-section. For example, the distal end may have a quadrangle cross-section. The distal end of the gear shaft 46 may also be bent in an L-shaped manner.

(7) The small diameter portion 50 is locked with the second hole 43b by bending the tabs 50a in the illustrated embodiment. Instead, a threaded hole may be formed in the circumference of the small diameter portion 50 and a bolt may be threaded to the hole to fix the axial position of the gear shaft 46. Alternatively, a snap ring may be used.

(8) The present invention may be applied to two-spoke type and four-spoke type steering wheels and to any other type of steering wheels.

(9) The spoke cores 6B, 6c may be coupled to the boss 8 by a fasteners, such as bolts.

(10) In the illustrated embodiment, the snap ring 59 limits the axial movement of the nut 34. The snap ring 59 may be replaced with a bolt. Alternatively, a radial protrusion may be integrally formed with the nut 34 to limit the axial movement of the nut 34.

(11) In the illustrated embodiment, the bolt 31 is formed at the distal end of the steering shaft 30 and the threaded hole 55, which receives the bolt 31, is formed in the nut 34. However, the positions of the bolt 31 and the threaded hole 55 may be reversed. That is, a threaded hole may be formed in the distal end of the steering shaft 30 and a bolt axially aligned with the threaded hole may be formed on the driven gear 56.

What is claimed is:

1. A device for mounting a steering wheel on a steering shaft of a vehicle, the device comprising:

a boss located at the center of the steering wheel, said boss having a hole for receiving the steering shaft, wherein inner splines are formed on an inner wall of said hole;

outer splines formed on the circumference of the steering shaft, said outer splines being engaged with said inner splines when said boss receives a distal end of said steering shaft;

a fastener rotatably connected to the steering wheel, said fastener having a second set of threads, wherein said second set of threads is tightened to a first set of threads provided at said distal end of said steering shaft to secure said boss to said steering shaft;

a driven gear formed on the surface of said fastener;

a gear shaft having an axis supported by the steering wheel, said gear shaft having a drive gear that meshes with said driven gear, wherein rotation of said gear shaft causes the fastener to rotate for fastening the steering wheel to the steering shaft; and a retainer connected to the steering wheel for retaining the fastener, wherein the fastener is loosely connected to the retainer to permit the fastener to rotate and move axially within predetermined limits, wherein the retainer is constructed and arranged to hold the fastener in a position that is axially spaced from the boss prior to installation of the steering wheel so that the inner and outer splines will engage before the first and second threads engage during installation, said retainer including a housing covering said boss, wherein said housing includes opposing, spaced apart side walls supporting said gear shaft in a position perpendicular to the axis of said steering shaft; and a plurality of bushings located between each of said opposing side walls and said gear shaft.

2. The device according to claim 1, wherein said fastener includes a small diameter portion that protrudes outward from the a front wall of said housing covering, a large diameter portion located between said front wall and said boss, and a step defined between said small diameter portion and said large diameter portion, wherein said step contacts the front wall just prior to the installation and is separated from said front wall after the fastener is secured to the steering shaft.

3. The device according to claim 1, wherein the driven gear is a worm wheel and the drive gear is a worm gear.

4. The device according to claim 1, wherein the bushing is made of either resin or rubber.

5. The device according to claim 1, wherein the first set of threads are male threads and the second set of threads are female threads.

6. The device according to claim 5, wherein the male threads of the steering shaft enter the fastener when the fastener is in contact with the front wall, and the outer splines mesh with the inner splines while the fastener is in contact with the front wall during the installation of the steering wheel.

7. The device according to claim 5, wherein the drive gear remains constantly engaged with the driven gear.

8. The device according to claim 7, wherein the retainer supports the gear shaft such that the axis of the gear shaft is transverse to the axis of the fastener.

9. A device for mounting a steering wheel on a steering shaft of a vehicle, the device comprising:

a boss located at the center of the steering wheel, said boss having a hole for receiving the steering shaft, wherein inner splines are formed on an inner wall of said hole;

outer splines formed on the circumference of the steering shaft, said outer splines being engaged with said inner splines when said boss receives a distal end of said steering shaft;

a retainer that is attached to the steering wheel to cover the boss, said retainer having a front wall that faces said boss, and opposing side walls to provide support for said front wall;

a female threaded nut rotatably retained by said retainer, wherein said boss is secured to the steering shaft by fastening the nut to a set of male threads provided at the distal end of said steering shaft, wherein said female threaded nut is retained in a predetermined axial position prior to installation such that said inner and outer splines mesh with one another before said set of male threads engage said female threaded nut during installation;

a driven gear formed on the surface of the female threaded nut;

a gear shaft having an axis rotatably supported by said retainer, said gear shaft having a drive gear that meshes with said driven gear, and wherein rotation of said gear shaft fastens the female threaded nut to the set of male threads by causing rotation of the female threaded nut, wherein said gear shaft extends substantially perpendicular to the axis of the steering shaft and is rotatably supported by said side walls of said retainer; and a plurality of bushings located between each of said opposing side walls and said gear shaft.

10. The device according to claim 9, wherein said driven gear is a worm wheel and the drive gear is a worm gear.

11. The device according to claim 9, wherein said plurality of bushings are made of one of resin and rubber.

12. The device according to claim 9, wherein said female threaded nut is supported by said retainer to permit axial movement of said female threaded nut, wherein the retainer includes means for limiting the axial movement of the female threaded nut.

13. The device according to claim 12, wherein the said female threaded nut includes a small diameter portion that protrudes outward from the front wall, a large diameter portion located between said front wall and said boss, and a step defined between the small diameter portion and the large diameter portion, wherein said step contacts said front wall just prior to the installation and is separated from the front wall when the fastener is tightened.

14. The device to claim 13, wherein the set of male threads of the steering shaft enter the female threaded nut when the female threaded nut is in contact with said front wall, and said outer splines mesh with said inner splines while the female threaded nut is in contact with said front wall during the installation.

* * * * *